United States Patent
DeGraaf et al.

(10) Patent No.: US 9,047,182 B2
(45) Date of Patent: Jun. 2, 2015

(54) MESSAGE SERVICE DOWNTIME

(71) Applicant: Microsoft Corporation, Redmond, WA (US)

(72) Inventors: Wilbert DeGraaf, Bellevue, WA (US); Yehia Ali Zayour, Redmond, WA (US); Srivalli Chavali, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 13/727,604

(22) Filed: Dec. 27, 2012

(65) Prior Publication Data

US 2014/0189442 A1     Jul. 3, 2014

(51) Int. Cl.
*G06F 11/00* (2006.01)
*G06F 11/07* (2006.01)

(52) U.S. Cl.
CPC ........ *G06F 11/0709* (2013.01); *G06F 11/0796* (2013.01)

(58) Field of Classification Search
CPC .................. G06F 11/0709; G06F 11/0796
USPC .................................. 714/4.1, 47.1, 47.2, 48
See application file for complete search history.

(56) References Cited

U.S. PATENT DOCUMENTS

| 6,266,781 | B1 |   | 7/2001 | Chung et al. |
| 6,728,781 | B1 | * | 4/2004 | Aguilera et al. ............. 709/240 |
| 6,826,619 | B1 | * | 11/2004 | Khare et al. ................. 709/232 |
| 7,676,580 | B2 |   | 3/2010 | Hill et al. |
| 8,484,512 | B2 | * | 7/2013 | Manning et al. ................. 714/18 |
| 8,631,283 | B1 | * | 1/2014 | Sivasubramanian et al. ............................ 714/47.1 |
| 2004/0205781 | A1 | * | 10/2004 | Hill et al. ...................... 719/328 |
| 2007/0294584 | A1 |   | 12/2007 | Jain et al. |
| 2010/0192025 | A1 | * | 7/2010 | Limprecht et al. .............. 714/48 |

OTHER PUBLICATIONS

Grujic, Dejan, "Surviving Poison Messages in MSMQ", Retrieved at <<http://www.cogin.com/articles/SurvivingPoisonMessages.php>>, Jan. 12, 2006, pp. 5.
"Poison Message Handling", Retrieved at <<http://msdn.microsoft.com/en-us/library/ms789028.aspx>>, Dec. 28, 2008, pp. 7.
"Removing Poison Messages", Retrieved at <<http://msdn.microsoft.com/en-us/library/ms166137(v=sql.105).aspx>>, Oct. 8, 2012, pp. 2.
Du, et al., "Preventing Network Instability Caused by Propagation of Control Plane Poison Messages", Retrieved at <<http://ieeexplore.ieee.org/stamp/stamp.jsp?tp=&arnumber=1180420>>, MILCOM 2002, vol. 1, Oct. 7, 2002, pp. 6.

* cited by examiner

*Primary Examiner* — Joshua P Lottich
(74) *Attorney, Agent, or Firm* — Louise Bowman; Jim Ross; Micky Minhas

(57) ABSTRACT

The description relates to addressing the downtime of a message service. One example can include determining that an error occurred during a message send process. A decision can be made whether the error is a suspicious error or a non-suspicious error. In an instance where the error is a suspicious error, any resend attempts can be limited to a number of times defined by a crash count threshold.

20 Claims, 4 Drawing Sheets

MESSAGE SERVICE DOWNTIME

BACKGROUND

Users expect message communications in the electronic realm to be seamless and instantaneous. As such, services involved in sending messages between users should be highly reliable. As with any service, inadvertent errors do occasionally occur. Further, and unfortunately, nefarious users sometimes attempt to disrupt these services by sending nefarious messages (e.g., attacks) that are configured to cause these services to crash. Techniques have been employed to allow services to protect themselves. However, in many instances a service can be incapacitated (e.g., crashed) by the messages. As such the service is unable to protect itself in many cases from subsequent nefarious messages and repeated crashes.

SUMMARY

The described implementations relate to the downtime of a message service. A message can be thought of as any type of data item, such as a text or email, that is sent from a sender to a recipient. Messages can be manifest according to various protocols, such as simple mail transfer protocol (SMTP), and short message service (SMS), among others. One example can include a message transfer agent configured to send a message to another message transfer agent. The message transfer agent can include a transaction result detector and a transaction result analyzer. The transaction result detector can be configured to monitor a result of the message transfer. The transaction result analyzer can be configured to analyze the result and select a course of action for the message transfer agent. This example can also include at least one processor configured to implement the transaction result detector and the transaction result analyzer.

Another example can include determining that an error occurred during a message send process. A decision can be made whether the error is a suspicious error or a non-suspicious error. In an instance where the error is a suspicious error, any resend attempts can be limited to a number of times defined by a crash count threshold. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present discussion. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent relates to reducing message service downtime. Messages are sent between services to ultimately reach a final destination. For instance, a first service can receive a message from a sender and transmit the message to another service for eventual delivery to a recipient. Some message transmissions (either purposely or inadvertently) can cause problems to the services. Tools exist for services to protect themselves. However, if a particular service crashes, as the service restarts it may be vulnerable to repeated attacks and crashes. The present implementations can allow services to act on behalf of another service to limit repeated crashes of the other service.

First System Example

Figure 1:
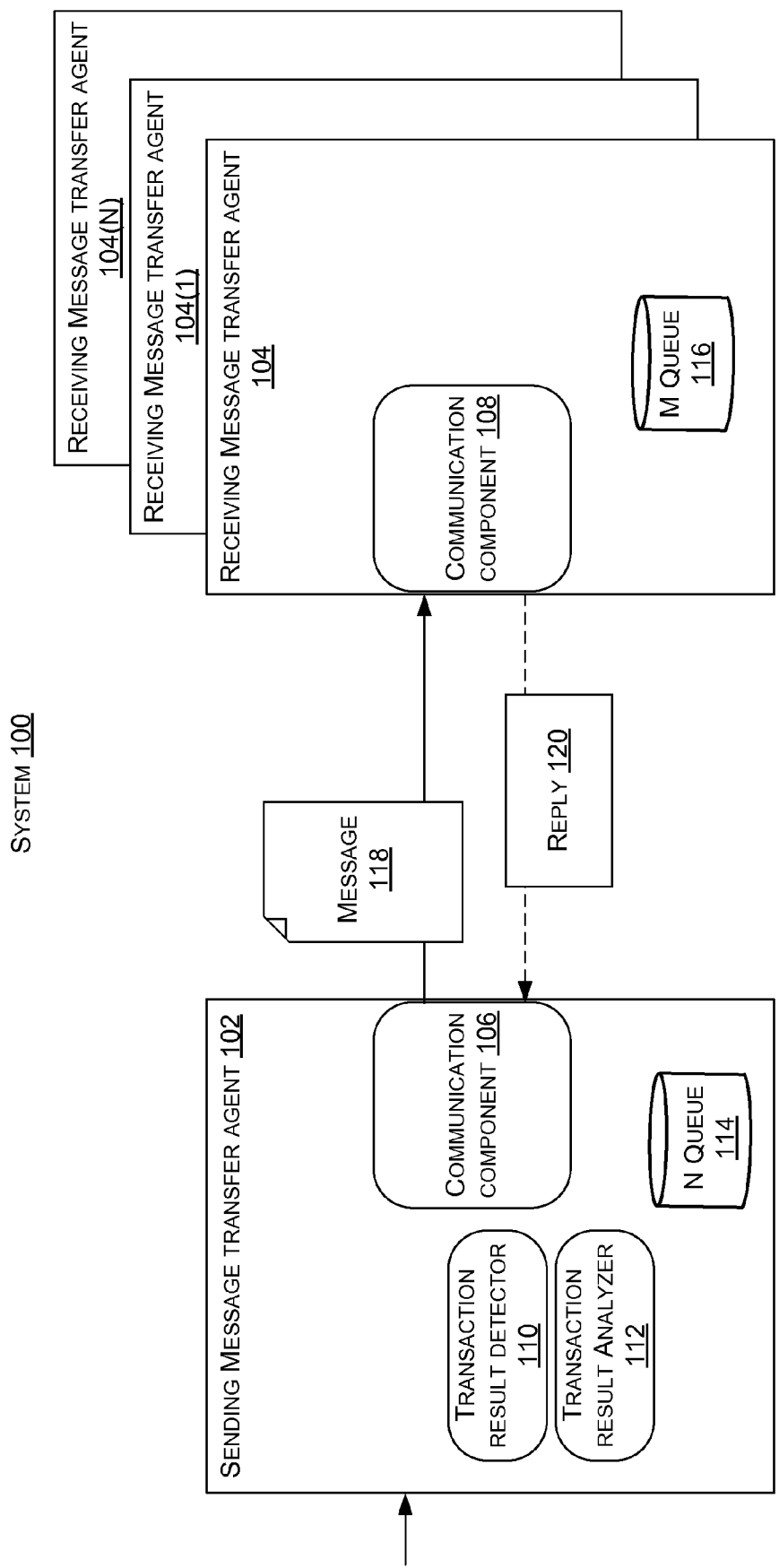
FIGS. 1 and 4 illustrate systems which can reduce message service downtime in accordance with some implementations of the present concepts.

FIG. 1 shows a system 100 that is configured to reduce message induced downtime. In this case, the system includes a sending message transfer agent 102 and one or more receiving message transfer agents 104. In the illustrated configuration, the sending message transfer agent 102 and the receiving message transfer agent 104 can include communication components 106 and 108, respectively. The sending message transfer agent can include a transaction result detector 110, a transaction result analyzer 112, and a nefarious queue 114. The receiving message transfer agent can include a message queue 116.

The sending message transfer agent 102 can receive a message 118 on behalf of a sender (not shown). The sending message transfer agent's communication component 106 can be configured to attempt to send the message 118 to the receiving message transfer agent's communication component 108 as a step toward delivery to the ultimate recipient. In most cases, the receiving message transfer agent 104 can send a reply 120 back to the sending message transfer agent.

In a first scenario the message 118 will be successfully received by the receiving message transfer agent 104. The received message can be queued in message queue 116. The receiving message transfer agent can then send the reply 120 (e.g., transaction complete signal) indicating the message was successfully received. In a second scenario, something can go wrong during the message transmission so that the message is not successfully received but the receiving message transfer agent remains functional and sends an error message in the reply 120. In a third scenario, something can go wrong during the message transmission so that the message is not successfully received by the receiving message transfer agent. In this third scenario, the receiving message transfer agent may be unable to send the reply 120. For example, the receiving message transfer agent may have crashed during the transmission process and as such be unable to send the reply 120.

The transaction result detector 110 can be configured to monitor for the result of the message transfer. In this case, monitoring for the result can include monitoring for the reply 120 and for the instance where no reply is timely received. The transaction result detector 110 can communicate the result to the transaction result analyzer 112.

The transaction result analyzer 112 can be configured to analyze the result and select a course of action for the sending message transfer agent 102. The transaction result analyzer can distinguish between these three scenarios and can cause an appropriate response. For example, responsive to the first scenario where the message 118 was successfully received by the receiving message transfer agent 104, the transaction result analyzer can cause the message handling to be completed. The transaction result analyzer can then cause the sending message transfer agent to handle other messages (if any).

Recall that in the second scenario, message transmission was unsuccessful, but reply 120 (indicating the error) was received from the receiving message transfer agent 104. The reply can indicate that the receiving message transfer agent remains functional (e.g., did not crash). This second scenario can itself include two variations. In a first variation, the error message can be a transient error message. The transient error message can indicate that something went wrong, but that the message 'send' can be reattempted (e.g., retried) at a future time. As such, a transient error message can be thought of as a 'retry later message'. In a second variation, the error message can be a permanent error message. The permanent error message can indicate not to retry the message resend process. The transaction result analyzer 112 can be configured to interpret this occurrence as an instance where the receiving message transfer agent is functional and thus able to handle the message. In such a case, the transaction result analyzer can cause the message to be handled according to the error message and/or according to protocols associated with the message type. For example, if the message is an SMTP message, the error message can be handled according to SMTP protocols. For instance, the message can be resent to the receiving message transfer agent 104, sent to another instance of the receiving message transfer agent 104(1) or 104(N), or handled in another manner consistent with the protocols.

Recall that in the third scenario, something went wrong during the message transmission so that the message 118 caused the receiving message transfer agent 104 to be unable to send the reply 120 (e.g., the receiving message transfer agent crashed). The transaction result analyzer 112 can interpret that this scenario could be the result of the message 118 causing the crash (e.g., the message 118 is potentially a nefarious message). However, the confidence in such a determination based upon a single occurrence (e.g., crash) can be relatively low. However, the transaction result analyzer 112 can cause the message 118 to be handled in a manner that can begin to protect the receiving message transfer agent 104.

Viewed from another perspective, when the sending message transfer agent 102 attempts to send message 118 to receiving message transfer agent 104, four possible scenarios can occur. The receiving message transfer agent 104 can: (1) accept the message; (2) permanently reject the message, due to permanent failure or policy reasons; (3) transiently reject the message; or (4) unintentionally fail to accept the message.

Instance (4) can occur when the receiving message transfer agent 104 crashed while accepting the message (e.g., during the message transaction). In such a case, there will likely be downtime for each attempt of the sending message transfer agent 102 to send (e.g., resend) the message 118. Traditional message transfer agents will treat case (3) and (4) the same, and will continue to try to send the message.

In contrast, at least some of the present implementations can reduce downtime by treating case (4) differently. For instance, the sending message transfer agent 102 can stop retrying the message 118 once the sending transaction result analyzer 112 has enough confidence that the receiving message transfer agent 104 will likely encounter issues while accepting the message. Stated another way, each time the message resend causes the same result (e.g., crash) the confidence of the decision that the message is a nefarious message increases. Case (4) can be detected in an instance where, during the message transaction, the connection times out or gets dropped. The time-out or dropped connection can be indicators that the message is potentially a nefarious message (e.g., suspicious message). The suspicious message can be handled differently than other messages. For instance, the suspicious message can be retried for a limited amount of times when the message transaction fails. Further details of methods that can be employed to handle suspicious messages are described below relative to FIGS. 2-3.

Note that the transaction result analyzer 112 can act independently to reduce downtime to the receiving message transfer agent 104 without any input or guidance from the receiving message transfer agent or other entities, such as an originator of the message.

In summary, when sending message transfer agent 102 attempts to send message 118 to receiving message transfer agent 104, the sending message transfer agent can decide whether the receiving message transfer agent has a problem while accepting the message. For example, if during the message transaction the message transaction times out (e.g., 'time-out' error) or the communication channel gets dropped, it can indicate the receiving message transfer agent crashed when handling the message. The crash can cause downtime to the receiving message transfer agent 104 and/or the system 100. The message transfer agent 102 can interpret this occurrence as an indication that the message is suspicious. In one case, sending message transfer agent 102 can limit sending attempts of the suspicious message to a threshold number. This can reduce downtime when compared to traditional techniques which tend to attempt to resend the message over and over for a period of time, such as for two days.

The sending message transfer agent 102 can take this action on its own accord without input from the receiving message transfer agent 104 (which may be compromised and unable to act on its own behalf). In one case, the sending message transfer agent can retry sending the message a limited amount of times defined by the crash count threshold. Each time the message send attempt results in a time-out or the communication channel gets dropped increases the likelihood that the message is the cause of the problems (e.g., is a nefarious message). As such, once the number of retries reaches the crash count threshold, there is enough confidence this message will continue to cause problems.

The transaction result analyzer 112 can then handle the message 118 in an appropriate manner. For instance, the message can be deleted or sent to the nefarious queue 114. Messages in the nefarious queue can be handled in various ways. For instance, in some implementations no further processing of a message is allowed once the message is sent to the nefarious queue. In such an implementation, the nefarious queue functions to provide a record of what happened to the message but no other action is taken. In other implementations, action may be taken to attempt to fix the server software that the message crashed. In such implementations, messages from the nefarious queue may be removed from the nefarious queue and resent. However, the message may still be handled as a 'suspicious' message. For instance, the message could be resent, but the existing crash count threshold could be maintained so that another failure causes the message to be returned to the nefarious queue.

The sending message transfer agent 102 can take action on its own to handle the nefarious message. Further, some implementations will purposefully not communicate this action (or a status of the message (e.g., error report)) to the entity from which the sending message transfer agent received the message. This strategy can prevent or reduce the likelihood that the message will be utilized to stage a subsequent denial of service attack. Traditional messaging systems do not differentiate the case where the receiving message transfer agent 104 is in serious enough trouble that it cannot act on its own behalf from the case where the receiving message transfer agent 104 willingly rejects the message transiently. As such, these traditional systems will continue to retry the message for an expiration time of typically 2 days.

First Method Example

Figure 2:
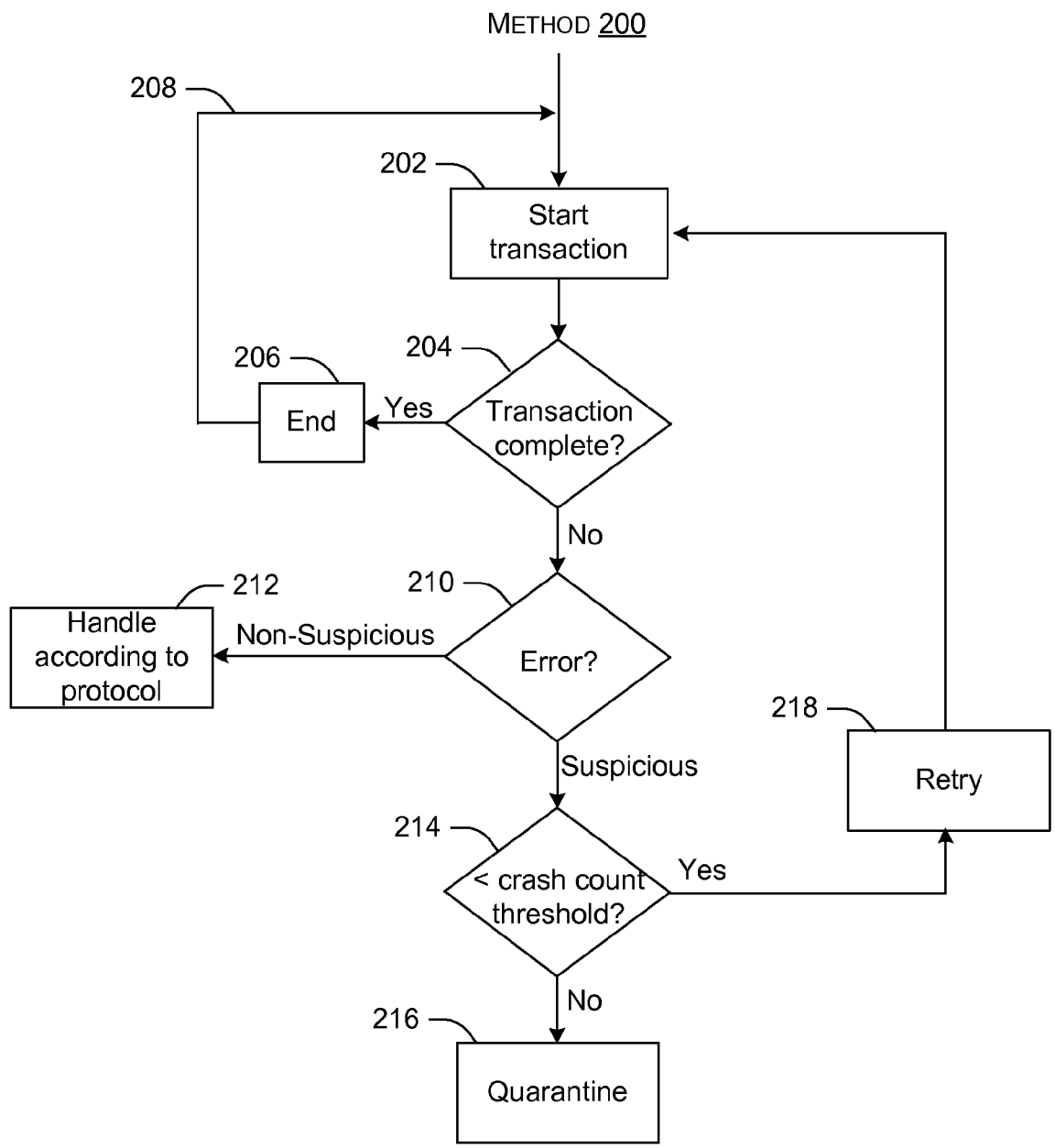
FIGS. 2-3 are flowcharts of message service downtime reducing methods that can be accomplished in accordance with some implementations of the present concepts.

FIG. 2 shows a flowchart of a method 200 for reducing downtime related to message communications. Method 200 can be performed by the elements of system 100 or by other devices or systems. Method 200 starts a message transaction at 202.

At 204, the method queries whether the transaction is complete (e.g., was the message successfully communicated to a receiver). If so (e.g., 'yes' at 204) then the method can end at block 206. The method can then start operating on a new message transaction as indicated at 208. If the message transaction was not completed successfully (e.g., 'no' at 204) then the method can determine what type of error caused the transaction failure at 210. If the error is determined to be non-suspicious, then the method can proceed to handle the error according to protocol at 212. This handling may include retrying the transaction (not shown) or other acts consistent with the protocol. Alternatively, if the error is determined to be suspicious, then the method can proceed to block 214.

Block 214 queries whether an error count (e.g., message crash count) for the message (e.g., how many times attempting to send the message has resulted in a transaction failure) is less than a crash count threshold. In an instance where the error count for the message is not less than the crash count threshold (e.g., 'no' at 214), then the method can quarantine the message at 216, or otherwise treat the message as a nefarious message. In an instance where the error count for the message is less than the crash count threshold (e.g., 'no' at 214), then the method can retry sending (e.g., resending) the message at 218. The resending can be subject to various constraints. For example, resending may involve a separate queue that has a lower priority than a queue related to sending new messages.

In summary, each time the message transaction fails and the failure is determined to be caused by a suspicious error, the confidence level that the message is a nefarious message can increase. Once the error count meets the crash count threshold, the confidence level that the message is a nefarious message is high enough to isolate the message. Awareness of the nefarious message can be created by generating a message tracking log entry which spells out that this message was considered to be a nefarious message. Other messages can continue to be processed. The determination that the message is a nefarious message can be performed without input from a receiving server or a user (e.g., external input).

Second Method Example

Figure 3:
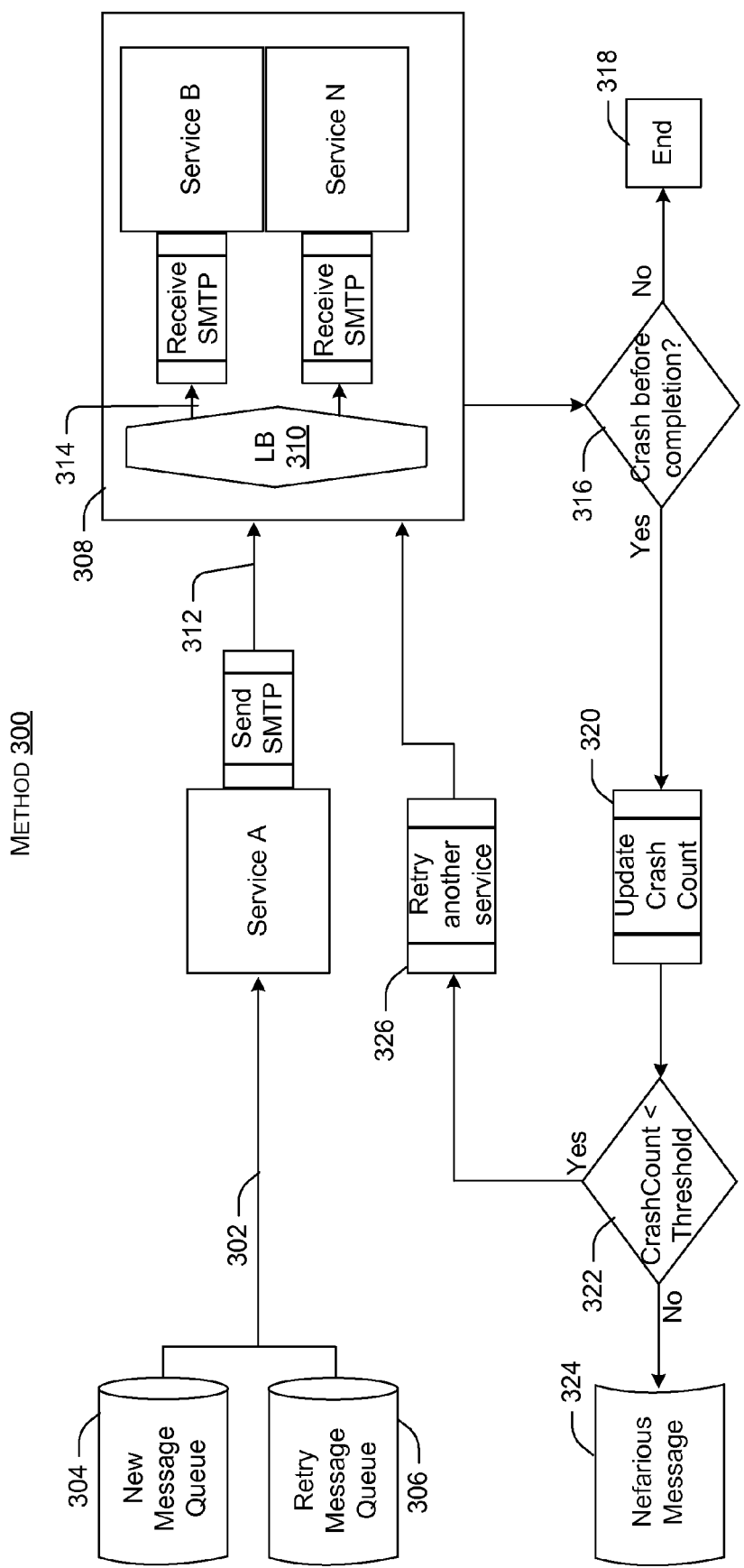

FIG. 3 shows a flowchart of another method 300 for reducing downtime related to message communications. Method 300 can be performed by the elements of system 100 or by other devices or systems.

Method 300 starts at point 302 where a Service A receives a message. The message can be received from a new message queue 304 or a retry message queue 306. For purposes of explanation, assume that this message will be transferred over SMTP, but the method can be applied to other types of message protocols. Service A acts as a sending service and sends the SMTP message to a datacenter 308 that includes a load balancer 310 as indicated at 312. The datacenter 308 can include Service B and Service N ("N" representing that any number of one of receiving services can be employed). In this case, the load balancer 310 can direct the SMTP message to Service B as indicated at 314. The method can determine whether the SMTP message caused Service B to crash before completion at 316. If 'no' the message did not cause Service B to crash (e.g., the message was successfully sent) the method can end at 318 and return to point 302 and await a new message.

If the message did cause a crash before completion ('yes' at 316, then the method can update a crash count associated with the message at 320. The method can then determine whether the crash count is less than a crash count threshold at 322. In an instance where the crash count is not less than the crash count threshold (e.g., 'no' at 322), the method can treat the message as a nefarious message as indicated at 324.

In an instance where the crash count is less than the crash count threshold (e.g., 'yes' at 322) the method can retry sending the message to another service at 326, such as Service N.

In summary, when the message is created by the user, it flows via SMTP or other protocol through various services for processing. While being processed by a service, it can cause the service to crash. The earlier the crash is detected in the process, the better (at least in some configurations).

The crash can happen within a service or during communication with the next service. Some of the present implementations can detect a nefarious message in both these cases as early in the process as possible and prevent that nefarious message from going through the system again.

The detection can be made more or less aggressive based on a configurable crash count threshold (e.g., an upper limit of times that the message caused the service to crash). The crash count threshold can be a static predefined value. Alternatively, the crash count threshold could be adjustable by the administrator. In still another configuration, the crash count threshold could be dynamic based upon previous crashes and/or the value could be different for different types of errors. For instance, a time-out error could be considered more dangerous and assigned a lower crash count threshold than a dropped connection error, for example.

This can be done in a secure manner so that the hacker, if any, would not know that they have caused the system to crash, while allowing the system administrators to track such messages.

Detection

In some implementations, detection can relate to detection of at least two scenarios. The first scenario is when the service itself crashes. A service crash can be identified by an unhandled exception in the service. In that case, the method can permanently store information about the message. The information can relate to an identifier of the message and a crash count of the message.

When the message is retried, the detection can involve checking against this permanent storage and if the crash count is equal to the crash count threshold, then the message can be classified as a nefarious message. Otherwise, the crash count can be incremented in the permanent storage.

The second scenario is when the next service fails while communicating with it. This second scenario can be identified by network errors, such as socket errors, while sending the message to the next service (e.g., server) or while receiving the response from the service. In some cases, there can be a load balanced list of services that the message can be sent to for further processing. When the message is sent to the next service and it crashes, the message crash count can be incremented in memory. The message can be retried with another service as long as the crash count is below the crash count threshold. In the case where there are not enough services to retry (i.e., if the crash count threshold is greater than the number of available services) then the same service can be retried once it is restarted. This can avoid the case where a message is never quarantined because the crash count threshold is never reached. In this instance, the detection involves checking the message crash count with the crash count threshold.

Handling

Once a nefarious classification has been assigned to the message, the message can be handled in any safe manner. In some cases, further processing of the message is stopped. In some implementations, an error report (such as a non-delivery receipt (NDR)) is not sent for security reasons to prevent the nefarious entity (e.g., hacker), if any, from knowing that their message caused the services to crash. Further, the message details can be logged with special flags (e.g., nefarious message) to facilitate diagnostics for the system administrators.

The order in which the methods are described is not intended to be construed as a limitation, and any number of the described blocks or acts can be combined in any order to implement the method, or an alternate method. Furthermore, the method can be implemented in any suitable hardware, software, firmware, or combination thereof, such that a computing device can implement the method. In one case, the method is stored on at least one computer-readable storage medium as a set of instructions such that execution by a computing device causes the computing device to perform the method.

Second System Example

Figure 4:
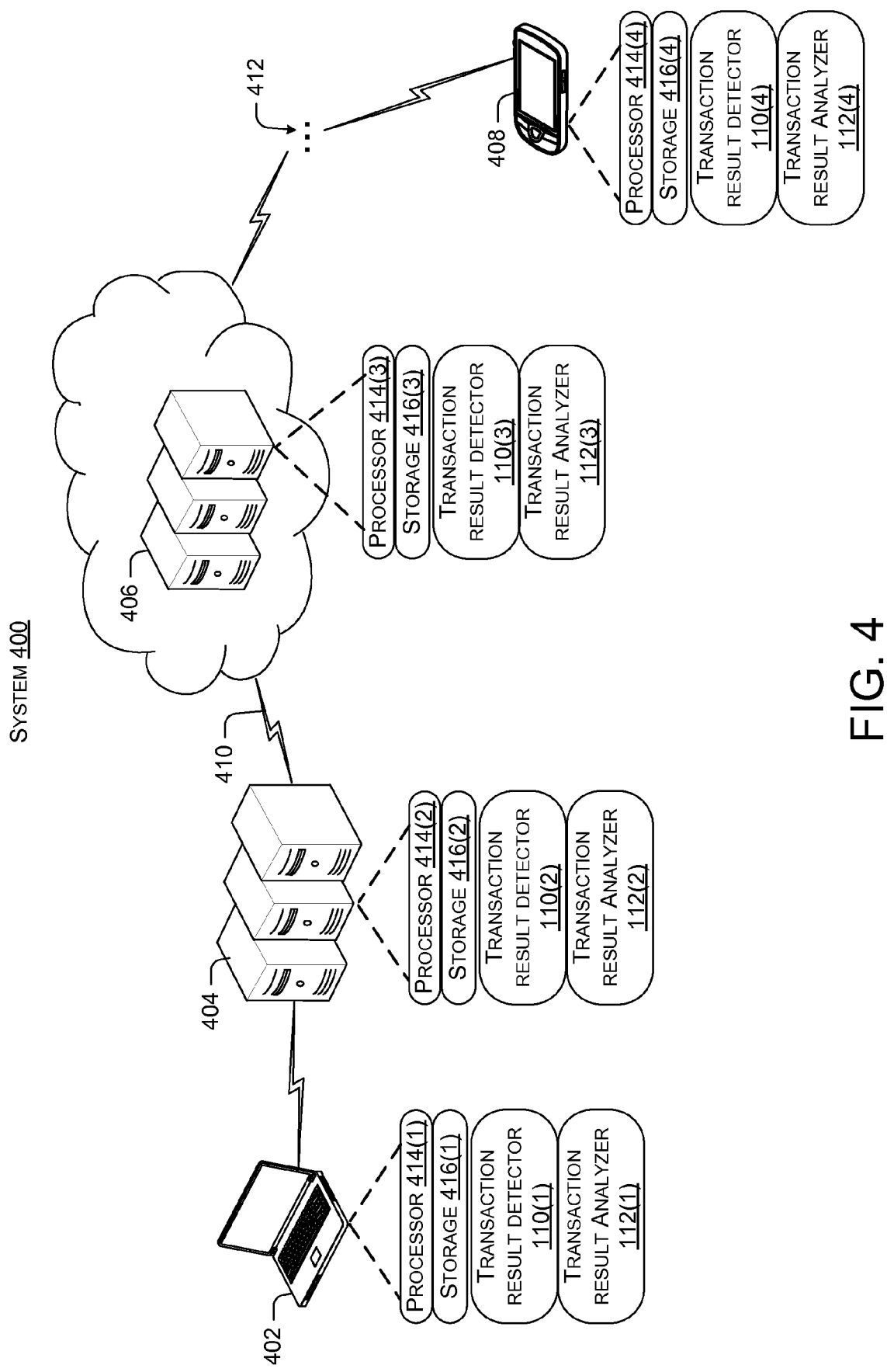

FIG. 4 illustrates a system 400 that shows various computer implementations configured to reduce downtime related to message communications. Of course not all computer implementations can be illustrated and other computer implementations should be apparent to the skilled artisan from the description above and below. In this case, four computer implementations are illustrated. Computer 402 is manifest as a notebook computer. Computer 404 is manifest as one or more server computers operating cooperatively. Computer 406 is also manifest as one or more cloud-based server computers operating cooperatively. Computer 408 is manifest as a smart phone type computer. The computers can be connected via one or more networks 410 (represented by 'lightning bolts'). Further, while only two server computers 404 and 406 are illustrated, three dots are shown at 412 to indicate that any number of server computers can be involved in a given system.

Computers 402, 404, 406, and 408 can include several elements which are defined below. For example, these computers can include a processor 414, storage/memory 416, transaction result detector 110, and transaction result analyzer 112. The suffix "(1)" is used to indicate an instance of these elements on computer 402, the suffix "(2)" is used to indicate an instance of these elements on computer 404, the suffix "(3)" is used to indicate an instance of these elements on computer 406, and suffix "(4)" is used to indicate an instance of these elements on computer 408. Reference to these elements without a suffix is intended to be generic. The computers 402-408 can alternatively or additionally include other elements, such as input/output devices, buses, graphics cards, etc., which are not illustrated or discussed here for sake of brevity.

The term "computer" or "computing device" as used herein can mean any type of device that has some amount of processing capability and/or storage capability. Processing capability can be provided by one or more processors (such as processor 414) that can execute data in the form of computer-readable instructions to provide a functionality. Data, such as computer-readable instructions, can be stored on storage, such as storage/memory 416 that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In the illustrated implementation computers 402-408 are configured with a general purpose processor 414 and storage/memory 416. In some configurations, a computer can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the transaction result detector 110 and/or the transaction result analyzer 112 can be installed as hardware, firmware or software during manufacture of the computer or by an intermediary that prepares the computer for sale to the end user. In other instances, the end user may install the transaction result detector 110 and/or the transaction result analyzer 112, such as in the form of a downloadable application.

Examples of computers can include traditional computing devices, such as personal computers, desktop computers, notebook computers, cell phones, smart phones, personal digital assistants, pad type computers, cameras, or any of a myriad of ever-evolving or yet to be developed types of computing devices. Further, aspects of system 400 can be manifest on a single computer or distributed over multiple computers.

CONCLUSION

Although techniques, methods, devices, systems, etc., pertaining to reducing message service downtime are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. At least one computer-readable storage medium having instructions stored thereon that when executed by a computing device cause the computing device to perform acts, comprising:
   receiving a message at a first service;
   attempting to send the message to a second service;
   determining whether the attempting caused the message to be successfully sent to the second service or whether an error occurred that caused the message to not be successfully sent to the second service;
   in an instance where the error occurred, increasing a crash count associated with the message;
   comparing the crash count to a crash count threshold; and,
   in an instance where the crash count exceeds the crash count threshold, quarantining the message as a nefarious message without reporting a status of the message to an entity from which the message was received.

2. The computer-readable storage medium of claim 1, further comprising, in an instance where the crash count is less than the crash count threshold, adding the message to a retry message queue.

3. The computer-readable storage medium of claim 1, further comprising, in an instance where the crash count is less than the crash count threshold, attempting to send the message to another instance of the second service.

4. The computer-readable storage medium of claim 1, further comprising, in the instance where the error occurred, determining whether the error was a time-out error, a connection dropped error or another type of error.

5. The computer-readable storage medium of claim 4, wherein the increasing, comparing, and quarantining are performed only for the time-out error or the connection dropped error.

6. A method implemented by a computing device, the method comprising:
    determining an error occurred during a message send process;
    deciding whether the error is suspicious error or non-suspicious; and,
    in a first instance where the error is a suspicious error, limiting any resend attempts to a threshold number.

7. The method of claim 6, wherein the determining comprises receiving an error message or interpreting that the error occurred because the message send process timed-out without successfully sending the message.

8. The method of claim 7, further comprising, in a second instance where the error is a non-suspicious error, handling the non-suspicious error in accordance with a protocol associated with the message.

9. The method of claim 7, wherein the receiving an error message comprises receiving a connection dropped message, a retry later message or a do not retry message.

10. The method of claim 9, wherein the deciding is performed by the computing device that performed the message send process, and wherein the deciding is not based upon any information obtained from other devices except for the connection dropped message, the retry later message, or the do not retry message.

11. The method of claim 7, wherein the message send process is performed by a first service to a second service and wherein the deciding comprises deciding the error is suspicious when the message send process causes the second service to crash.

12. The method of claim 11, performed by the first service.

13. A system, comprising:
    a processing device; and
    a storage device storing computer-executable instructions which, when executed by the processing device, cause the processing device to implement a first message transfer agent,
    wherein the first message transfer agent is configured to send a message to a second message transfer agent, and
    wherein the first message transfer agent comprises:
        a transaction result detector configured to monitor a result of a message transfer; and
        a transaction result analyzer configured to analyze the result and select a course of action for the first message transfer agent by:
            determining an error occurred during a message send processing,
            deciding whether the error is suspicious or non-suspicious, and,
            in an instance where the error is a suspicious error, limiting any resend attempts to a threshold number.

14. The system of claim 13, wherein the transaction result detector is configured to detect a transaction complete signal or the error in the form of: an error message from the second message transfer agent, a time-out error, or a connection dropped error.

15. The system of claim 13, wherein the transaction result analyzer is configured to distinguish the suspicious error from non-suspicious errors.

16. The system of claim 15, wherein the transaction result analyzer is configured to limit a number of times that the message is resent to a crash count threshold.

17. The system of claim 15, wherein the transaction result analyzer is configured to distinguish the suspicious error from the non-suspicious errors without any external input except for a transaction complete signal, an error message from the second message transfer agent, a time-out error, or a connection dropped error.

18. The system of claim 15, wherein the message is a given format and the transaction result analyzer is configured to cause the first message transfer agent to handle the non-suspicious errors according to a protocol for the format.

19. The system of claim 18, wherein in the case of the non-suspicious errors, the transaction result analyzer is configured to cause an error report to be sent to an entity which sent the message to the first message transfer agent and in the case of the suspicious error, the transaction result analyzer is configured not to cause the error report to be sent to the entity which sent the message to the first message transfer agent.

20. The system of claim 13, wherein the system is manifest on a single server computer or wherein the system is manifest on a set of cooperatively operating servers.

* * * * *